United States Patent [19]

DeShetler

[11] 4,020,630
[45] May 3, 1977

[54] CHAIN ADJUSTMENT LINK

[75] Inventor: Louis K. DeShetler, Allen Park, Mich.

[73] Assignee: Whitehead & Kales Company, River Rouge, Mich.

[22] Filed: Oct. 17, 1975

[21] Appl. No.: 623,492

[52] U.S. Cl. .............................. 59/86; 24/116 R; 59/93
[51] Int. Cl.² ...................................... F16G 15/04
[58] Field of Search ........................ 59/86, 93, 85; 24/116 R, 68 CT, 69 CT, 69 T, 70 CT, 73 CE; 294/75, 82 R

[56] References Cited

UNITED STATES PATENTS

| 138,165 | 4/1873 | Kilner | 24/116 R |
| 1,303,521 | 5/1919 | Sylvester | 24/116 R |
| 3,777,477 | 12/1973 | Biondo | 59/93 |

FOREIGN PATENTS OR APPLICATIONS

| 550,570 | 9/1956 | Belgium | 59/93 |
| 1,270,232 | 7/1961 | France | 24/116 R |

Primary Examiner—C.W. Lanham
Assistant Examiner—Gene P. Crosby
Attorney, Agent, or Firm—Whittemore, Hulbert & Belknap

[57] ABSTRACT

A device for adjusting the length of a link chain comprising a shackle or yoke in which the space between the arms is relatively wide except for a narrow portion at the closed end of the shackle. A length of chain extends through the space between the arms and is capable of moving lengthwise when in the relatively wide portion of the space. The relatively narrow portion of the space is wide enough to receive a link of the chain but not wide enough to permit the chain to move in a lengthwise direction. A pivoted keeper is adapted to project into the relatively wide portion of the space to retain the chain in the narrow portion and thereby prevent it from moving lengthwise.

14 Claims, 5 Drawing Figures

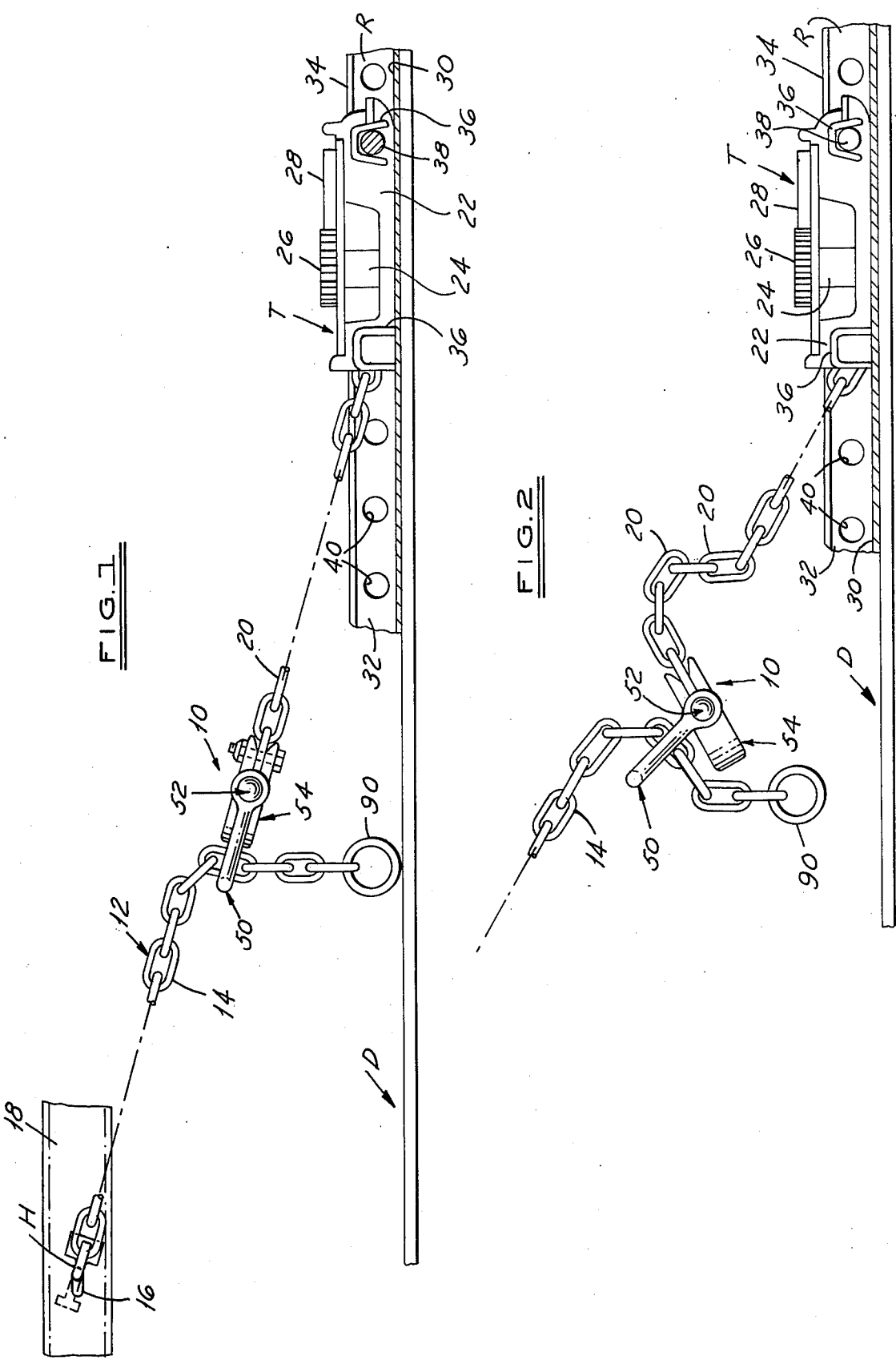

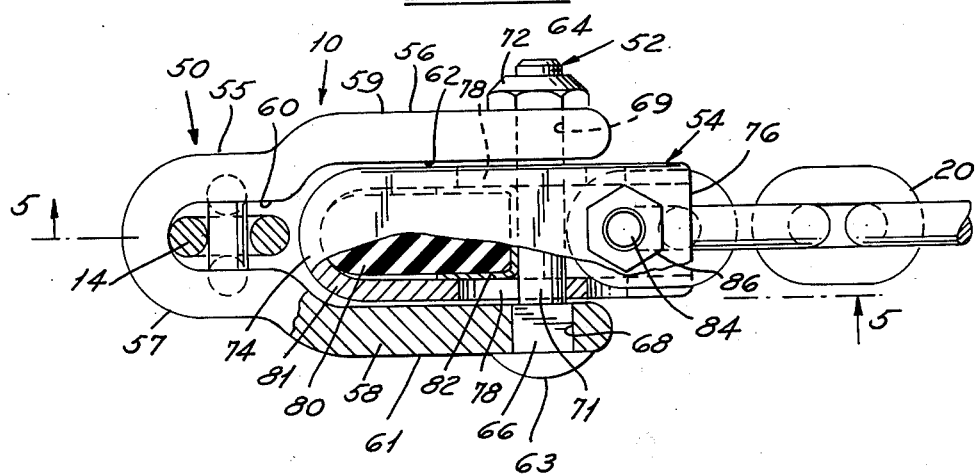
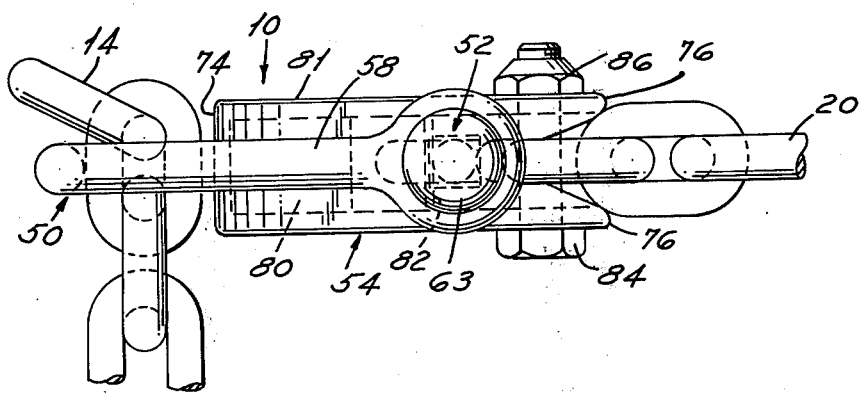
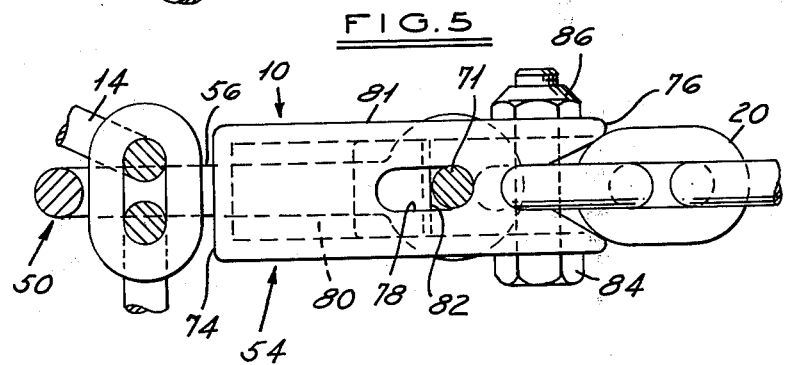

CHAIN ADJUSTMENT LINK

BACKGROUND AND SUMMARY OF THE INVENTION

The device of this invention is adapted to permit adjusting the length of a chain quickly and easily. The device is intended primarily for use in a system to tie down a vehicle on a transport such as a rail car, but is not limited to that use. Some vehicles have high frames and require long chains to tie them down. The smaller compact cars can be tied down with shorter chains. One of the objects of this invention therefore is to provide a device which may be used to shorten the length of a chain when desired.

The adjusting device of this invention comprises a yoke or shackle for receiving a length of chain, and a keeper for locking the chain to the shackle in adjusted position. The space or slot between the arms of the yoke has a narrow section for retaining the chain against lengthwise adjustment and a wide section in which the chain is capable of moving in the direction of its length. The keeper when disposed between the arms of the yoke retains the chain in the narrow portion of the space and thus locks it against movement. The chain can be adjusted as to length by pivoting the keeper out of the space between the arms.

A further object of the invention is to provide an adjusting device in which the keeper will normally retain a set position of rotation so that the chain will not accidentally be released. For this purpose, means are provided for resisting relative rotation between the keeper and the shackle.

A still further object of the invention is to provide a yieldable connection between the shackle and keeper permitting the device to be extended or stretched slightly so as to take up shock loads on the chain and thus prevent the chain from imposing unduly high stresses on the frame of the vehicle which is tied down.

Other objects and features of the invention will become more apparent as the description proceeds, especially when taken in conjunction with the accompanying drawings wherein:

FIG. 1 is a side elevational view with parts in section showing the chain adjustment device employed in a tie-down system for securing a vehicle on the deck of a rail car or other transport.

FIG. 2 is a view similar to FIG. 1 but shows the adjusting device in its released position.

FIG. 3 is an enlarged elevational view of the adjusting device with parts in section.

FIG. 4 is an elevational view of the adjusting device taken at right angles to the view of FIG. 3.

FIG. 5 is a view taken on the line 5—5 in FIG. 3.

Referring now more particularly to the drawings and especially to FIGS. 1 and 2, the adjusting device is generally designated 10 and is shown as part of a tie-down system for securing a vehicle on the deck D of a rail car or other transport. Briefly, the tie-down system comprises in addition to the adjusting device 10 a link chain 12 having a section 14 extending from the adjusting device 10 to a hook H at its free end which is shown in FIG. 1 engaged in an opening 16 in the frame 18 of the vehicle being tied down. The hook H may be of any suitable construction such, for example, as that shown in my U.S. Pat. No. 3,215,390 assigned to the assignee of this application. The chain 12 includes a second section 20 which extends from the adjusting device 10 to a tie-down device T which may be of any suitable construction such, for example, as the tie-down device shown in the patent to Donald J. Blunden and Allan C. Kack U.S. Pat. No. 3,564,577 and assigned to the assignee of this application.

The tie-down device T generally has a body or carriage 22 provided with a rotatable shaft 24 about which the chain section 20 is wrapped. The shaft 24 is rotated by a crank to take up the chain and make it taut and has a ratchet gear 26 engaged by a ratchet pawl 28 to prevent reverse rotation. The tie-down device T is slidably supported within a channel-shaped rail R secured lengthwise upon the deck D. The device T rests upon the base 30 of the channel between the side walls thereof, one of which is indicated at 32, the side walls having along their upper edges inturned flanges, one of which is indicated at 34, which overlie the laterally outwardly projecting lugs 36 along opposite sides of the carriage body 22 to prevent the carriage body from lifting up. A manually operable, transversely slidable latch bolt 38 on the carriage body is adapted to engage any one of the openings 40 spaced along the length of one of the side walls 32 of the channel to lock the tie-down device T against movement.

The adjustment device 10 comprises a yoke or shackle 50, a pin 52 extending across the open end of the shackle, and a keeper 54 pivoted to the pin.

The shackle 50 is of generally U-shape having a pair of arms 56 and 58. The arms 56 and 58 are closely spaced at the closed end of the shackle and then diverge so as to be more widely spaced from that point to the open end of the shackle. Both the closely spaced portions 55, 57 and the widely spaced portions 59, 61 of the arms 56 and 58 are shown as being parallel to one another. The closely spaced portions of the arms define a relatively narrow slot portion 60 therebetween and the relatively widely spaced portions of the arms 56 and 58 define a relatively wide slot portion 62 extending from the relatively narrow portion to the open end of the shackle. As seen in FIG. 3, the relatively narrow portion 60 of the slot or space is wider than the thickness of a link of the chain but narrower than the width of the chain links. Accordingly, a link of the chain may be received in the relatively narrow slot portion 60 but the chain cannot move lengthwise when in this relatively narrow slot portion. The relatively wide slot portion 62 is wider than the width of a chain link so as to permit the chain to move longitudinally or in a lengthwise direction when disposed in this wider slot portion.

The pin 52 is here shown as being of the type commonly called a carriage bolt. It has a rounded head 63 and a shank 64 which extends through aligned openings 68 and 69 in the arms of the shackle near the open end thereof. The portion 66 of the shank near the head is square and the opening 68 in the arm 58 in which it is disposed is likewise square and of the same dimensions so that the carriage bolt and shackle are incapable of rotating relative to one another. The remaining portion 71 of the shank 64 is cylindrical, that is of uniform circular cross section, and extends through the circular opening 69 in the arm 56. A nut 72 threaded on the end of shank 64 releasably secures the pin 52 and shackle 50 together.

The keeper 54 is an elongated tubular member which is closed at one end 74 and open at the opposite end 76. The cylindrical portion 71 of the shank 64 of pin 52 extends rotatably through the aligned slots 78 in the opposite side walls of the tubular keeper. These slots 78 are elongated in the direction of length of the keeper. Thus the keeper can slide in the slots 78 as well as rotate.

A body 80 of rubber or like compressible, resilient material substantially fills the space within the locking portion or nose 81 of the tubular keeper between the closed end 74 thereof and the pin 52. A channel-shaped retainer 82 of metal or like material covers the end of the body of rubber 80 opposite the closed end 74 of the keeper and bears against the shank 64 of pin 52. Preferably, the body of rubber 80 is under slight longitudinal compression so that the retainer 82 is at all times pressed against the pin 52 by the rubber with sufficient force to frictionally resist relative rotation between the keeper and the shackle. Enough resistance to rotation is desired as to prevent accidental relative rotation between the parts but not enough to prevent the keeper from being rotated by hand. In the locked position of the device 10 (FIG. 1) the nose 81 of the keeper 54 is disposed in the wide portion 62 of the space between the yoke arms to retain the chain section 14 in the narrow slot portion 60 where it cannot move lengthwise. In the released position (FIG. 2) the nose of keeper 54 is pivoted away to permit the chain section 14 to be shifted into the wide slot portion 62 where it can move lengthwise.

A bolt 84 extends across the open end of the keeper at the side of pin 52 opposite the nose 81 through aligned apertures in the opposite walls thereof at right angles to pin 52. A nut 86 releasably secures the bolt 84 to the keeper. The end link of chain section 20 extends around the bolt to secure the chain section 20 to the keeper.

The slots 78 in the keeper are elongated so as to permit limited linear extension of the device 10, in other words, to permit the keeper 54 to move to the right in FIGS. 3–5 relative to the shackle 50 against the compressive force of the body of rubber 80. Heavy shock loads on the chain are thus cushioned or absorbed to some extent and protect the frame of the vehicle being tied down from undue stress.

FIGS. 1 and 3 to 5 show the adjusting device 10 in its operative position in which the chain section 14 is locked in the relatively narrow slot portion 60 of the shackle by the keeper so that it cannot move in a lengthwise direction. FIG. 2 shows the adjustment device in a position in which the keeper is pivoted out of the relatively wide portion 62 of the space or slot between the shackle arms, permitting the chain section 14 to be moved into the relatively wide slot portion where the chain is free to move longitudinally so that an adjustment as to its length may be made.

Preferably, the hook H at one end of the chain section 12 is too large to pass through the relatively wide slot portion 62. An enlarged link 90 at the opposite end of chain section 12 is also too large to pass through the wide slot portion 62. Hence the chain section and adjusting device 10 cannot become separated except by taking the adjusting device apart. In place of the enlarged link 90, a second hook of the same construction as hook H, or of a different construction may be used.

In order to tie down a vehicle, the chain section 20 should first be pulled all the way out of the tie-down device T by releasing ratchet pawl 28. Then the vehicle is spotted after which the tie-down device T is secured to the channel R by bolt 38. The next two steps are interchangeable and consist of connecting the hook H to the vehicle frame 18 and adjusting chain section 14 to proper length. Adjusting the length of chain section 14 requires keeper 54 to be manually pivoted out of the space or slot between the yoke arms to the FIG. 2 position so that the chain section 14 may be adjusted lengthwise in the wide slot portion 62, and then locking the chain section 14 in the narrow slot portion 60 by pivoting the keeper 54 back to the space between the yoke arms to the FIG. 1 position. The last step is taking up the ratchet to make the chain taut. The tension in the chain holds the keeper in the locked FIG. 1 position with the nose 81 in the wide space 62 between the arms of the yoke, because the chain section 20 is attached to the keeper at the side of the pin 52 opposite the nose.

What I claim as my invention is:

1. A device for adjusting the length of a link chain comprising a member having a slot therein of a width sufficient to receive a link chain and permit lengthwise movement thereof, a slot extension communicating with said slot but of a lesser width sufficient to receive a link of the chain but insufficient to permit lengthwise movement thereof, a keeper carried by said member and moveable from a locking position projecting into said slot to retain the chain, inserted from either side of the slot, in said slot extension to a released position away from said slot, and a tensioning element such as a second chain attached to said keeper in a manner such that tension in said tensioning element retains said keeper in its locking position.

2. A device for adjusting the length of a link chain comprising a shackle of generally U-shape having a pair of arms, a pin connecting said arms near the open end of said shackle, the space between said arms being adapted to receive and permit lengthwise movement of a first section of link chain except for a portion of said space near the closed end of said shackle which is so restricted as to receive a link of the link chain section but prevent lengthwise movement thereof, and a keeper pivoted to said pin for movement from a locking position to a released position and attachable to a tensioning element such as a second link chain section, said keeper having a locking portion which in said locking position of said keeper projects into the space between said arms to retain said first link chain section in said restricted portion of said space and in the released position of said keeper projects away from said space.

3. The device defined in claim 2, wherein said space is a slot relatively narrow where restricted and relatively wide from there to said pin.

4. The device defined in claim 2, wherein said keeper is an elongated member pivoted intermediate its ends to said pin and has means at one side of said pin for attachment to the tensioning element, said locking portion being at the opposite side of said pin so that tension in the tensioning element will hold said locking portion projected into the space between said arms of said shackle.

5. The device defined in claim 4, wherein said device is capable of limited linear extension to cushion shock load on the chain.

6. The device defined in claim 4, including means for resisting relative rotation between said shackle and said keeper.

7. The device defined in claim 6, wherein said rotation resisting means comprises a member carried by said keeper and pressing against said pin.

8. The device defined in claim 6, wherein said rotation resisting means comprises a member carried by said keeper and yieldably pressing against said pin, and a non-rotating connection between said shackle and said pin.

9. The device defined in claim 4, including means interposed between said pin and one of said keeper and shackle permitting limited linear extension of said device to cushion shock load on the chain.

10. The device defined in claim 9, wherein said last-mentioned means comprises an elongated slot in said keeper receiving said pin, and resilient means pressing said pin to one end of said elongated slot.

11. The device defined in claim 4, the locking portion of said keeper being a hollow nose and having a body of resilient compressible material therein pressing against said pin and frictionally resisting rotation of said keeper on said pin, and a non-rotating connection between said shackle and said pin.

12. The device defined in claim 11, wherein said pin extends pivotally through a slot in said keeper which slot is elongated in the direction of length of said keeper, said body of resilient compressible material pressing said pin toward one end of said elongated slot and permitting limited extension of said device to cushion shock load on the chain.

13. A device for adjusting the length of a link chain comprising a member having a slot therein of a size adapted to receive and permit lengthwise movement of a first section of the link chain except for a portion of said slot which is so restricted as to receive a link of the link chain section but prevent lengthwise movement thereof, and a keeper pivoted to said member for moement from a locking position to a released position and having attached thereto a tensioning element such as a second section of link chain, said keeper having a locking portion which in said locking position of said keeper projects into said slot to retain said first link chain section, inserted from either side of the slot, in said restricted portion of said slot and in the released position of said keeper projects away from said slot.

14. The device defined in claim 13, wherein said restricted portion of said slot provides the sole means of preventing lengthwise movement of the first link chain section.

* * * * *